(12) United States Patent
Lutnick et al.

(10) Patent No.: US 10,210,713 B2
(45) Date of Patent: *Feb. 19, 2019

(54) ROULETTE GAME

(71) Applicant: CFPH, LLC, New York, NY (US)

(72) Inventors: Howard W. Lutnick, New York, NY (US); Dean P. Alderucci, Westport, CT (US); Geoffrey M. Gelman, Brooklyn, NY (US); Kevin Burman, Hunters Hill (AU)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,352

(22) Filed: Dec. 16, 2013

(65) Prior Publication Data

US 2014/0106841 A1   Apr. 17, 2014

Related U.S. Application Data

(63) Continuation of application No. 11/852,558, filed on Sep. 10, 2007, now Pat. No. 8,613,447.

(60) Provisional application No. 60/825,012, filed on Sep. 8, 2006, provisional application No. 60/825,812, filed on Sep. 15, 2006, provisional application No. 60/826,298, filed on Sep. 20, 2006.

(51) Int. Cl.
| | |
|---|---|
| A63F 1/18 | (2006.01) |
| G07F 17/32 | (2006.01) |
| A63F 5/00 | (2006.01) |

(52) U.S. Cl.
CPC ............ *G07F 17/3286* (2013.01); *A63F 5/00* (2013.01); *G07F 17/32* (2013.01); *G07F 17/3202* (2013.01); *A63F 2250/28* (2013.01)

(58) Field of Classification Search
CPC .................................. A63B 71/00; A63F 1/18
USPC ...................................................... 273/142 C
See application file for complete search history.

(56) References Cited

U.S. PATENT DOCUMENTS

| 4,357,015 | A | | 11/1982 | Santora | |
|---|---|---|---|---|---|
| 5,588,650 | A | * | 12/1996 | Eman et al. | 273/142 B |
| 5,755,440 | A | * | 5/1998 | Sher | 273/142 E |
| 5,775,993 | A | | 7/1998 | Fentz | |
| 5,836,583 | A | | 11/1998 | Towers | |
| 6,164,646 | A | | 12/2000 | Uehara et al. | |
| 6,520,854 | B1 | * | 2/2003 | McNally | 463/17 |
| 6,676,126 | B1 | * | 1/2004 | Walker et al. | 273/139 |
| 6,890,255 | B2 | * | 5/2005 | Jarvis | G07F 17/32 463/17 |
| 6,921,072 | B2 | * | 7/2005 | Hughes-Watts | 273/142 E |
| 7,090,150 | B2 | * | 8/2006 | Amaduzzi | 239/526 |

(Continued)

FOREIGN PATENT DOCUMENTS

| CN | 1745864 A | 3/2006 |
|---|---|---|
| EP | 0763374 | 3/1997 |

(Continued)

OTHER PUBLICATIONS

AU Examination Report for Application No. 2007294515; dated Jun. 4, 2010; 3 pages.

(Continued)

*Primary Examiner* — John E Simms, Jr.
*Assistant Examiner* — Dolores Collins

(57) ABSTRACT

According to various embodiments, an apparatus may laser project a customized ordering of numbers onto a roulette wheel.

15 Claims, 3 Drawing Sheets

(56) References Cited

U.S. PATENT DOCUMENTS

| | | | |
|---|---|---|---|
| 7,094,150 B2* | 8/2006 | Ungaro | G07F 17/32 |
| | | | 273/274 |
| 7,233,922 B2* | 6/2007 | Asher et al. | 705/36 R |
| 7,553,233 B2* | 6/2009 | Jarvis | G07F 17/32 |
| | | | 463/17 |
| 7,566,269 B2* | 7/2009 | B-Jensen et al. | 463/20 |
| 7,571,910 B1* | 8/2009 | Launzel | A63F 5/0094 |
| | | | 273/138.1 |
| 7,674,172 B2* | 3/2010 | Miltenberger et al. | 463/17 |
| 7,708,635 B2* | 5/2010 | Walker et al. | 463/20 |
| 7,753,770 B2* | 7/2010 | Walker et al. | 463/20 |
| 7,762,883 B2* | 7/2010 | Griswold | A63F 5/00 |
| | | | 273/138.2 |
| 7,833,101 B2* | 11/2010 | Lutnick et al. | 463/42 |
| 7,918,725 B2* | 4/2011 | Baerlocher | G07F 17/3211 |
| | | | 463/16 |
| 7,946,912 B1* | 5/2011 | Rennard | A63F 5/00 |
| | | | 273/138.1 |
| 7,976,025 B2* | 7/2011 | Hebden | 273/292 |
| 8,267,403 B2* | 9/2012 | Fisher et al. | 273/142 B |
| 8,444,470 B2* | 5/2013 | Gurule | 463/17 |
| 8,460,085 B2* | 6/2013 | Alderucci et al. | 463/20 |
| 8,474,820 B2* | 7/2013 | Walker et al. | 273/274 |
| 8,543,487 B2* | 9/2013 | Asher et al. | 705/37 |
| 8,595,758 B2* | 11/2013 | Taylor et al. | 725/25 |
| 8,613,447 B2* | 12/2013 | Lutnick et al. | 273/142 C |
| 8,727,863 B2* | 5/2014 | Gurule | 463/17 |
| 8,777,716 B2* | 7/2014 | Miller | 463/17 |
| 8,851,475 B2* | 10/2014 | Nordahl et al. | 273/145 C |
| 2002/0169017 A1* | 11/2002 | Visoenik | G07F 17/38 |
| | | | 463/17 |
| 2005/0059477 A1* | 3/2005 | Baerlocher | G07F 17/3211 |
| | | | 463/20 |
| 2005/0059478 A1* | 3/2005 | Peterson | G07F 17/3211 |
| | | | 463/20 |
| 2005/0173863 A1* | 8/2005 | Walker et al. | 273/292 |
| 2005/0255904 A1* | 11/2005 | Duhamel | 463/17 |
| 2006/0066044 A1* | 3/2006 | Dabosh | 273/139 |
| 2006/0217174 A1* | 9/2006 | Walker | G07F 17/32 |
| | | | 463/16 |
| 2007/0167216 A1* | 7/2007 | Walker et al. | 463/18 |
| 2007/0213124 A1* | 9/2007 | Walker et al. | 463/25 |
| 2008/0076507 A1* | 3/2008 | Wertheimer | 463/17 |
| 2008/0132311 A1* | 6/2008 | Walker | 463/16 |
| 2008/0214264 A1* | 9/2008 | Griswold et al. | 463/17 |
| 2008/0214266 A1* | 9/2008 | Phillips | G07F 17/3213 |
| | | | 463/17 |
| 2008/0248866 A1* | 10/2008 | Cove | 463/25 |
| 2009/0104963 A1* | 4/2009 | Burman et al. | 463/18 |
| 2011/0184534 A1* | 7/2011 | Yeriazarian et al. | 700/9 |
| 2012/0231865 A1* | 9/2012 | Asher et al. | 463/17 |
| 2012/0231871 A1* | 9/2012 | Asher et al. | 463/20 |
| 2012/0238343 A1* | 9/2012 | Perrone et al. | 463/17 |
| 2013/0029741 A1* | 1/2013 | Kuhn | 463/17 |
| 2013/0214486 A1* | 8/2013 | Shelburn et al. | 273/142 E |
| 2014/0187306 A1* | 7/2014 | Nordahl | G07F 17/3202 |
| | | | 463/17 |
| 2014/0357338 A1* | 12/2014 | Pockaj | A63F 3/062 |
| | | | 463/16 |
| 2014/0357340 A1* | 12/2014 | Pockaj | G07F 17/326 |
| | | | 463/17 |

FOREIGN PATENT DOCUMENTS

| | | |
|---|---|---|
| EP | 0763374 B1 | 3/1999 |
| EP | 1413338 A1 | 4/2004 |
| EP | 1627670 A2 | 2/2006 |
| JP | H11-137770 | 5/1999 |
| JP | 2007-098031 | 4/2007 |

OTHER PUBLICATIONS

EP Office Action for Application No. 07842122.9; dated Mar. 30, 2011; 4 pages.

AU Notice of Acceptance for Application No. 2007294515; dated Nov. 11, 2011; 3 pages.

AU Examination Report for Application No. 2012200466; dated Aug. 12, 2012; 3 pages.

Notification of Transmittal of the International Search Report and the Written Opinion of the International Searching Authority for International Application No. PCT/US07/77983 dated Aug. 12, 2008, 12 pages.

EP Extended Search Report for Application No. 12001480.8; dated Jun. 18, 2012; 5 pages.

JP Office Action for Application No. 2009-527604; dated Mar. 27, 2013; 6 pages (w/English translation).

AU Examination Report for Application No. 2014202650; dated Jun. 1, 2015; 3 pages.

AU Examination Report for Application No. 2016203602; dated May 10, 2017; 3 pages.

EP Exam Report for Application No. 12001480.8; dated May 28, 2013; 4 pages.

JP Office Action for Application No. 2009-527604; dated Jun. 24, 2014; 5 pages (w/English translation).

JP Office Action for Application No. 2009-527604; dated Mar. 22, 2016; 4 pages (w/English translation).

JP Appeal Decision for Application No. 2009-527604; dated Jul. 26, 2016; 4 pages (w/English translation).

JP Office Action for Application No. 2014-215043; dated Dec. 1, 2015; 6 pages (w/English translation).

JP Office Action for Application No. 2014-215043; dated Oct. 4, 2016; 6 pages (w/English translation).

JP Office Action for Application No. 2017-012702; dated Mar. 6, 2018; 10 pages (w/English translation).

* cited by examiner

Roulette Wheel Layout

| Number | Position | Color |
|--------|----------|-------|
| 0 | 0 | green |
| 26 | 1 | black |
| 3 | 2 | red |
| 35 | 3 | black |
| 12 | 4 | red |
| 28 | 5 | black |
| 7 | 6 | red |
| 29 | 7 | black |
| 18 | 8 | red |
| 22 | 9 | black |
| 9 | 10 | red |
| 31 | 11 | black |
| 14 | 12 | red |
| 20 | 13 | black |
| 1 | 14 | red |
| 33 | 15 | black |
| 16 | 16 | red |
| 24 | 17 | black |
| 5 | 18 | red |
| 10 | 19 | black |
| 23 | 20 | red |
| 8 | 21 | black |
| 30 | 22 | red |
| 11 | 23 | black |
| 36 | 24 | red |
| 13 | 25 | black |
| 27 | 26 | red |
| 6 | 27 | black |
| 34 | 28 | red |
| 17 | 29 | black |
| 25 | 30 | red |
| 2 | 31 | black |
| 21 | 32 | red |
| 4 | 33 | black |
| 19 | 34 | red |
| 15 | 35 | black |
| 32 | 36 | red |

ROULETTE GAME

This application is a continuation of U.S. patent application Ser. No. 11/852,558, filed Sep. 10, 2007, which claims the benefit of the following applications: U.S. Provisional Patent Application Ser. No. 60/825,012, filed Sep. 8, 2006; U.S. Provisional Patent Application Ser. No. 60/825,812, filed Sep. 15, 2006; and U.S. Provisional Patent Application Ser. No. 60/826,298, filed Sep. 20, 2006. These applications are incorporated by reference herein in its entirety.

BACKGROUND

Various apparatus have been employed for conducting games.

SUMMARY

According to various embodiments, an apparatus enables for customized play of a game.

BRIEF DESCRIPTION OF THE DRAWINGS

FIG. 1 shows an exemplary layout of a roulette reel.

FIG. 2 shows an exemplary tabular implementation of a function.

FIG. 3 shows an exemplary tabular implementation of a function.

DETAILED DESCRIPTION

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Embodiments of the Invention

In various embodiments a player may make a bet on a game of roulette. In some embodiments, in making the bet, the player may physically provide cash, chips or other considerations. In some embodiments, the bet may be a notional amount, which, for example, is understood but not immediately provided.

The bet may include a designated outcome. The designated outcome may be specified by the player making the bet. The designated outcome may be a number, such as 19. The designated outcome may be a color, such as "black". The designated outcome may be any other possible outcome.

A spin of the roulette wheel may determine an actual outcome of the game. In various embodiments, the actual outcome is the outcome that occurs from the play of the game. For example, the actual outcome may be the number that is indicated once the wheel has been spun and once the ball comes to rest in the numbered pocket corresponding to the number. The player may then be paid based on the relationship between the actual outcome and the designated outcome.

In various embodiments, the payout of the bet can be based on the numerical difference between the number which is the actual outcome and the number which is the designated outcome. For example, the payout of the bet can be a linear function of the numerical difference between the number which is the actual outcome and the number which is the designated outcome.

In some embodiments, if the actual outcome is greater than the designated outcome, the player is paid a positive amount that is proportional to the difference between the number which is the actual outcome and the number which is the designated outcome. The constant of proportionality may be the amount of the bet placed by the player. In some embodiments, the amount paid to a player may be B*(Actual Outcome−Designated Outcome). In some embodiments, the amount paid to the player may be paid only if the actual outcome is greater than the designated outcome. If the actual outcome is less than the designated outcome, then the casino may keep an amount bet by the player, but the player may have no further obligations. In some embodiments, the amount paid may have the potential to be negative. For example, if the actual outcome is less than the designated outcome, then the amount paid may be negative. A negative amount paid may indicate that the player has to pay the casino. The player may pay the casino an amount according to the above formula. In other words, the player may pay the casino an amount that is proportional to the amount by which the actual outcome is less than the designated outcome.

In various embodiments, the player may be paid a positive amount if the actual outcome is less than the designated outcome. In some embodiments, the amount paid to the player may be B*(Designated Outcome−Actual Outcome).

In some embodiments, a player may be paid based on the physical distance on a roulette reel between the actual outcome and the designated outcome. The physical distance may be measured in terms of numbers or spaces. For example, the actual and designated outcomes may be one and the same, in which case the distance may be 0. The actual and physical outcomes may be adjacent to each other on the roulette wheel, in which case the distance may be 1. The actual and physical outcomes may have 1 space between them, where the space corresponds to a third number on the roulette wheel. In this case, the distance between the actual and physical outcomes may be two. A distance may be considered positive if it corresponds to one direction. For example, if the actual outcome occurs after the designated outcome in a clockwise direction, then the distance between the actual outcome and the designated outcome may be considered to be positive. If the actual outcome occurs before the designated outcome in the clockwise direction, then the distance between the actual outcome and the designated outcome may be considered to be negative. It will be appreciated, that the reverse could be true as well, e.g., the actual outcome occurring after the designated outcome in the counter-clockwise direction would make the distance between the outcomes positive. Note that a relationship between the actual and the designated outcomes may be based on which is the closer distance between them. For example, the actual and designated outcomes may be considered to be one space apart or 37 spaces apart. The lower distance may govern, in various embodiments. In various embodiments, an amount paid to a player may be B*(Distance Between the Actual and Designated Outcome). In some embodiments, the amount paid to a player may be B*(Position of Actual Outcome−Position of Designated Outcome). The position of an outcome may refer to the physical position of a number on a roulette wheel, with positions labeled "1" through "38" going clockwise from an arbitrary starting point. In some embodiments, positions may be labeled "0" through "37" or may be labeled with any other range of numbers, including fractional, and/or negative numbers. In various embodiments, a distance may be measured in terms of units such as centimeters or inches. In some embodiments, distance may be measured in terms of degrees or radians.

In some embodiments, a player may be paid based on the absolute value of the difference between an actual outcome and a designated outcome. For example, a player may be paid B*|Actual Outcome−Designated Outcome|. In some embodiments, a player may be paid −B*|Actual Outcome−Designated Outcome|.

Note that in any of the formulas described herein, a constant may be added to the amount paid. This constant may be adjusted so as to result in a targeted expected payment to the player. For example, a player may be paid B*(Actual Outcome−Designated Outcome)+C. In various embodiments, the casino may wish to pay the player in such a way as maintain a target house edge. The casino may accordingly create or adjust the formula for paying a player so as to maintain the target house edge. The target house edge may be set as the house edge that is present for a traditional bet on roulette (e.g., for a bet on a single number in the traditional game of roulette).

In various embodiments, a player may be paid based on any function of the actual and designated outcomes. For example, the amount paid to a player may be F(Actual Outcome, Designated Outcome), where F is any function. In various embodiments, a player may be paid based on any function of the amount bet, the actual outcome, and the designated outcome.

In some embodiments, the designated outcome is preset. In some embodiments, the designated outcome is 18. For example, a player is paid 0 if the actual outcome is 18. A player is paid 1 if the actual outcome is 19. A player is paid 2 if the actual outcome is 20, and so on. A player owes 1 if the actual outcome is 17. A player owes 2 if the actual outcome is 16. A player owes 3 if the actual outcome is 15, and so on. A player may owe 18 if the actual outcome is "0" or "00".

In various embodiments, a bet on a game of roulette may constitute a spread bet. The "spread" may refer to the distance between an actual outcome and the designated outcome, whether the distance is numerical, physical, or in some other units.

FIG. 1 depicts an exemplary layout for a roulette wheel. A position of 0 is arbitrarily assigned to the outcome "0". Proceeding clockwise from "0", each outcome is assigned the next integer position, i.e., 1, 2, and so on up to 36.

Figure 2:
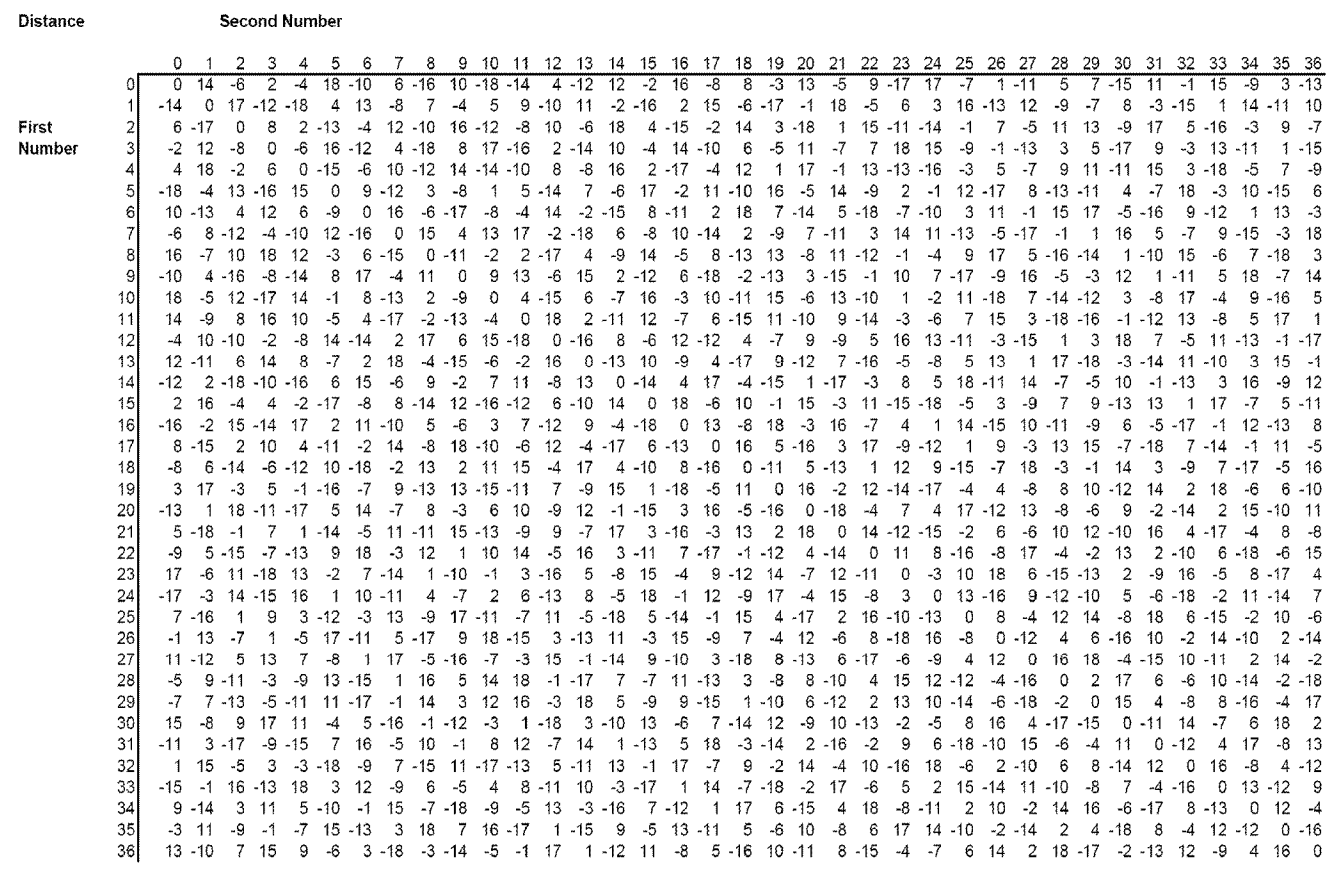

In various embodiments, a function may describe the distance between any two numbers on a roulette wheel. The function may receive as inputs two numbers, where such numbers are two different numbers that are found on the same roulette wheel. The distance may take the form of an integer, such as "0", "1", "2", and so on. The output of the function may be a distance. In various embodiments, the function may be defined and/or implemented by a table. The table may include a reference column containing numbers on a roulette wheel, and a reference row containing numbers on a roulette wheel. A distance between a first and second number may be found by looking up the first number in the reference column, looking up the second number in the reference row, and finding the distance in the table that corresponds to both reference numbers. An exemplary table is depicted in FIG. 2. In FIG. 2, a positive distance indicates the number of positions that the second number is away from the first number, going in the clockwise direction. A negative distance indicates the number of positions that the second number is away from the first number in the counter-clockwise direction.

In some embodiments, a function may describe a second number on a roulette wheel that can be found a given distance from a first number. The inputs to the function may include a first number and a distance. The output of the function may be a second number that is the given distance on the roulette wheel away from the first number. In various embodiments, the function may be defined and/or implemented by a table. In the table, a reference column may include numbers on a roulette wheel. A reference row may include distances. To find a second number on a roulette wheel that is a given distance from a first number, the first number may be found in the reference column, the distance may be found in the reference row, and the second number in the table may be found that corresponds to both the reference number and the reference distance. An exemplary table is depicted in FIG. 3.

Figure 3:
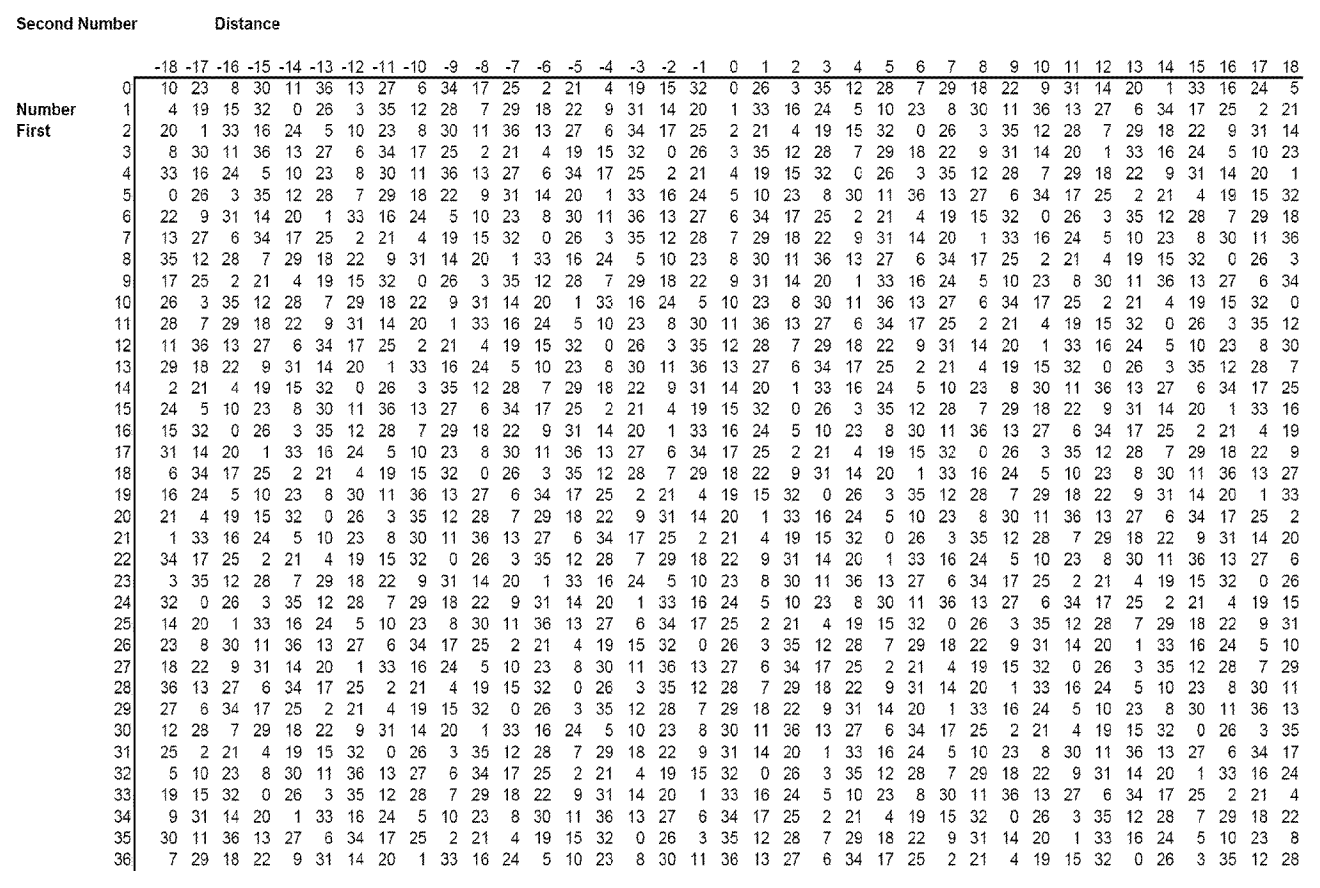

Note that FIGS. 1, 2, and 3 are based on a layout of a European roulette wheel. The roulette wheel has a "0" space, but no "00" space. However, it will be appreciated that similar tables could readily be constructed for an American roulette wheel, or for a roulette wheel with any layout of outcomes besides that depicted in FIG. 1. All such tables are contemplated by various embodiments.

In various embodiments, a player may be paid based on a non-linear function of the distance between an actual outcome and a designated outcome. The distance may be a numerical distance a physical distance, or any other distance. For example, a player may be paid based on the cube of the distance between an actual outcome and a designated outcome. For example, a payment to a player may be equal to B*(Distance Between Actual and Designated Outcome)^3, where B is some constant.

In some embodiments, a player may be paid according to a binary function. The player may be paid a first amount if the actual outcome is a positive distance from the designated outcome, and a second amount if the actual outcome is a negative distance from the designated outcome. For example, if the designated outcome is 18, a player may be paid an amount equal to his bet if the actual outcome is greater than 18, and may lose an amount equal to his bet if the actual outcome is less than 18. If the actual outcome is equal to 18, the player may either win or lose, in various embodiments, or may tie.

In some embodiments, one or more outcomes may be designated. A player may place a bet and win if the designated outcomes do not occur. For example, a player may designate the numbers 1 through 5. The player may win if a number other than 1, 2, 3, 4, or 5 occurs. If a number from 1 to 5 does occur, the player may lose his bet. As will be appreciated, payout odds may be determined based on the number of outcomes and/or based on the likelihood of outcomes designated by the player. For example, payout odds may be set very low if a player designates only one number since it is highly likely that the number won't come up. However, payout odds may be set higher if a player designates all numbers over 10, since there is a good chance that a number over 10 will occur.

In various embodiments, the actual outcome of a spin of a roulette wheel may be detected automatically. For example, the "Roulette wheel winning number detection system" described in U.S. Pat. No. 6,616,530 to Pearce, et al. may be used to automatically determine an actual outcome in a game of roulette. U.S. Pat. No. 6,616,530 is incorporated by reference herein. The payout to a player may be calculated automatically based on a determination of an actual outcome, based on a calculation of a difference between the actual outcome and a designated outcome, and based on a calculation of a function of the difference.

Various embodiments describe the use of data in a gaming context, such as in the context of casino gaming, mobile gaming, charity bingo, or on-line gaming. In various embodiments, data generated in a first game may be used in a second game. For example, a set of data may be generated in a first game. The set of data may be used to determine an outcome of the first game. The same set of data may also be used to determine an outcome of a second game. For example, in a game of blackjack, 14 cards may be dealt. Data indicating the ranks and suits of the 14 cards may be recorded. Such data may later be used to conduct a game of video poker. In conducting the game of video poker, data about a first 5 of the 14 cards may be presented to a player, leaving 9 cards remaining. The player may select 3 discards, after which data about 3 replacement cards may be presented to the player from the data about the 9 cards remaining. In various embodiments, data in a first game may be generated through physical means. Generation of data through physical means may include generating data through a process that is not solely based on the manipulation of electrons and photons. The generation of data through physical means may include the generating an outcome at a roulette wheel, the dealing of one or more cards from a deck of cards, the rolling of a die, or any other physical or partly physical process. The generation of data through physical means may include the generation of a roulette outcome through the manual spinning of a roulette wheel, e.g., by a casino employee. The generation of data through physical means may include the generation of a roulette outcome through the automatic spinning of a roulette wheel, e.g., by computer controlled motors. The generation of data through physical means may include the rolling of dice by a human, such as a craps player. The generation of data through physical means may include the rolling of dice automatically, e.g., through the motorized spinning of a transparent enclosure containing dice.

In various embodiments, the outcomes and/or the resolutions of events in a first game may be used as inputs for generating outcomes and or resolutions of events in a second game. For example, the outcomes and/or resolutions of events in a first game may serve as random numbers for use in an algorithm for generating outcomes and/or resolutions in a second game. In some embodiments, the outcomes and/or resolutions of events in a first game may be directly used as outcomes or resolutions in a second game (e.g., without any further transformations). In various embodiments, a first game may include a game of a player or a game that has been conducted automatically (e.g., without participation by any player). In various embodiments, a first game may include a game where outcomes or resolutions have been generated through physical processes (e.g., as opposed to electronic processes). For example, the first game may include outcomes or resolutions that have been generated through a roll of dice, through a spin of a roulette wheel, through the dealing of cards, or through any other physical process.

Readers

Data may be recorded from a first game in various ways. In some embodiments, a human may manually enter data from a game. For example, a casino employee may use a keyboard to key in the numbers 4 and 3, representing the numbers rolled on two dice in a game of craps. In some embodiments, a sensor or reader may detect and record data from a game. A roulette reader may detect and record the spaces in which a roulette ball has landed following a spin of a roulette wheel. An exemplary roulette sensing apparatus is described in U.S. Pat. No. 4,396,193 to Reinhardt, et al., entitled "Roulette wheel directional sensing apparatus". U.S. Pat. No. 4,396,193 is hereby incorporated by reference. A card shoe may be equipped with sensors and/or algorithms for reading cards dealt from the shoe and determining data about the cards, such as rank and suit. An exemplary such card shoe is described in U.S. Pat. No. 7,029,009 to Grauzer, et al., entitled "Playing card dealing shoe with automated internal card feeding and card reading". U.S. Pat. No. 7,029,009 is hereby incorporated by reference. In various embodiments, a camera may capture images of a game being played. Data may be extracted from such images, including data about cards dealt, data about rolls of dice, and data about a number generated at a roulette wheel. Such data may be extracted using image processing algorithms, for example. U.S. Pat. No. 4,531,187 to Uhland, entitled "Game monitoring apparatus" describes a "means for optically monitoring the cards played" in a game. U.S. Pat. No. 4,531,187 is hereby incorporated by reference.

Camera

In various embodiments, a camera may record footage of a first game being played. For example, a camera may record footage of dice being rolled, of cards being dealt, of a roulette wheel being spun, and so on. In various embodiments, the footage may be stored. In various embodiments, the footage may be stored in association with one or more tags or other data, including a date during which the filmed game was played, a time during which the game was played, a game identifier, an identifier for a player in the game (e.g., a player's name), an identifier for a dealer in the game, a location of the game, a casino in which the game was played, an indication of the type of game being played (e.g., blackjack; e.g.; craps), and so on. Subsequent to the video footage being recorded, a player involved in a second game may indicate a desire to see the video footage. The player in the second game may be involved in a game that uses data from the game depicted in the video footage. For example, the player involved in the second game may be involved in a game of video poker that uses the same cards originally dealt in a game of blackjack. The player may desire to see film footage of the game of blackjack. The player may desire to see the film footage so as to verify that the cards dealt in the game of blackjack, which are the same cards now being used in his own game, were dealt fairly. Any tags stored in association with the video footage may aid the house or casino in retrieving the video footage upon a player's request. For example, data used in a second game may be tagged with an identifier of a first game. A player in the second game may request to see video footage of how that data was generated in the first game.

Accordingly, a casino may search for video footage that is stored in association with the identifier. Any such video footage may then be retrieved and shown to the player in the second game.

Skins

In various embodiments, data generated in a first game may be used in a second game. One or more algorithms may be used to transform the data from the first game into data suitable for use in the second game. For example, data from a first game may include number in a first range. Data suitable for use in a second game may include numbers in a second range. Accordingly, for example, data from the first range may be mapped to the second range using a mathematical transformation, such as multiplication or division by a constant. For example, data from a first game may include data about cards dealt in the first game (e.g., the first game is game of blackjack). Such data may take the form of numbers, where the numbers 1 through 52 each represent a different card in a standard deck of 52 cards. Data required for the second game may include numerical data in the range of 1 to 6, since the second game may be a dice game (e.g., craps). Accordingly, data from the range of 1 to 52 may be mapped to data in the range of 1 to 6. The mapping may occur as follows. It will be appreciated that many other mappings are possible. A number from 1 to 52 is completely discarded if the number is 49, 50, 51, or 52. If a number is discarded, a second number is then used (e.g., a number representing a different card that was dealt in the first game). If a number is not discarded, the number is divided by eight and the result is rounded up to the nearest integer. Thus, the number 1 will map to the number 1, the number 2 will map to the number 1, the number 8 will map to the number 1, the number 9 will map to the number 2, the number 17 will map to the number 3, and the number 48 will map to the number 6. A mapping has thus been accomplished from a game of cards to a game of dice. Two or more cards may be used from the game of cards (more than two cards may be needed if one of the cards is represented by a number greater than 48) to conduct a roll of dice in a game of craps.

Once data suitable for use in the second game is obtained, an appropriate skin may be used with the second game. The skin may include graphics and play patterns that make the second game more familiar to the player of the second game. For example, once data has been generated which includes numbers between 1 and 6, the casino (or a device of the casino, such as a gaming device) may be used to graphically render the generation of outcomes that corresponds to the data. For example, if numbers 3 and 6 have been generated as data suitable for a second game, the casino may show graphical depictions of the numbers 3 and 6 being rolled on a pair of dice. Thus, the player may engage in a game of craps.

Note that in various embodiments, data used in a second game may be based on data that has been derived from a first game which was played in the past. Thus, the outcome of the second game may be pre-determined, in some sense. However, since the player of the second game may not be familiar with the first game, or since the player may not be familiar with the algorithm used to transform data from the first game into data used in the second game, the player may be unable to take advantage of advanced knowledge of the outcome of the second game.

In various embodiments, data generated in a first game may be used in a second game that is played on a gaming device. The gaming device may be a slot machine, video poker machine, video bingo machine, mobile gaming device (e.g., a mobile gaming device as defined by Nevada bill AB 471), and so on. In various embodiments, data generated in a first game may be used in a second game that is played over a network. Data generated in a first game may be used in Internet gaming, such as in conducting a second game at an on-line casino. Similarly, video footage from the first game may be available for a player who participates in the second game at the on-line casino. By viewing the video footage, the player may become more confident that the data being used in the second game was generated fairly.

Auditing the Data Generated in the First Game

In various embodiments, data generated at a first game or a first series of games may be tested or audited to provide verification that the data is fair. In various embodiments, a test may be performed to verify that the data conforms to some statistical distribution. The statistical distribution may be a distribution that is generally thought to govern in the one or more random processes used to generate the data. For example, a set of data may include data about 10,000 outcomes generated at one of a group of roulette wheels, each roulette wheel having 38 spaces. An applicable statistical distribution may predict that each possible outcome of the roulette wheel would occur approximately once every 38 outcomes, or approximately 263 times out of the data set of 10,000 outcomes. Thus, a test of the data about the 10,000 outcomes might test that each of the 38 possible outcomes of a roulette wheel occurred approximately 263 times out of the 10,000 outcomes. The tests may allow for some deviation. For example, it may be considered acceptable for an outcome to occur from 213 to 313 times. However, if an outcome occurs a number of times that is not between 213 and 313, then the data may be considered suspicious. Data may be required to pass one or more tests, such as tests of statistical distribution, before the data will be permitted to be used in a second game.

In various embodiments, a player may bet on geometrical configurations of numbers or outcomes at a roulette wheel. In some embodiments, a player may bet on numbers that are exactly opposite to one another on a roulette wheel (or as close to being exactly opposite as possible). In some embodiments, a player may bet on numbers that are 180 degrees apart on the roulette wheel. A player may bet on a group of geometrically related numbers using a single bet. For example, player may make a bet that wins if the either the numbers "0" or "5" appear on a roulette wheel. As can be seen from FIG. 1, the positions of "0" (position 0) and of "5" (position 18) are opposite to one another on the roulette wheel described. The player may win his bet if either the number 0 or the number 5 appears. The player may win, for example, 17 times his bet if he wins.

In some embodiments, a player may bet on four numbers which effectively form four points of a compass. A player may bet on four numbers which together divide the roulette wheel into four arcs of equal or approximately equal length. The player may place a single bet and may win if any of the four numbers appear. In some embodiments, a player may place a bet on N numbers which together divide the roulette wheel into N arcs of equal or approximately equal length. The player may have the benefit of placing a single bet on the N numbers. The player may have the benefit of being able to place a bet on a series of numbers forming a geometrical pattern without having to determine the geometrical pattern on his own. For example, a player can place a bet on two numbers that are 180 degrees apart on a roulette wheel without having to manually inspect the roulette wheel and determine which two numbers are 180 degrees apart. In various embodiments, bets may be available for any conceivable geometrical pattern of numbers. For example, a player may bet on a pattern of numbers that represent the five points of a star. The player may place a single bet to bet on numbers in the pattern.

In some embodiments, a player may bet that numbers of a particular pattern of numbers will each occur once in a series of sequential spins. For example, a player may place a bet on five numbers that form the points of a five-pointed star. The player may win his bet if each of the numbers occurs once in the next five spins of the roulette wheel. In some embodiments, a player may bet that a particular pattern of numbers will occur in a particular order during a sequential set of spins. For example, a player may bet that five numbers forming the five points of a star will occur in a particular order.

In various embodiments, as numbers occur during spins of a roulette wheel, a screen or other display device may show a line being drawn to connect the numbers which have occurred, e.g., on a graphic rendering of a roulette wheel. For example, after a first and second spin, a line may be drawn connecting the number which occurred in the first spin with the number which occurred in the second spin. After a third spin, a line may be drawn from the number which occurred in the second spin to the number which occurred in the third spin. In various embodiments, a player may have the objective of forming a particular geometric pattern as lines are drawn between the numbers occurring on successive spins of the roulette wheel. For example, a player may bet that a box shape will be drawn in the next four spins. The player may win if any box shape is drawn. For example, a player may bet that a five-pointed star will be drawn.

In various embodiments, a player may bet on the occurrence of any number in a geometrical pattern of numbers. For example, a player may bet that any one of four numbers that divide the wheel into equal length arcs will occur. The player may also bet on numbers that are adjacent to the aforementioned numbers. Thus, for example, a player may bet on twelve numbers, such that there are four groups of three numbers, and the center numbers in each group of three together divide the wheel into four arcs of equal length. In this way, a player may bet on a particular geometric pattern, but may increase his chances of winning the bet by also betting on nearby numbers to those numbers defining the geometrical pattern. In another example, a player may bet on a first set of two numbers that are opposite one another. The player may also bet on a second set of two numbers such that each number in the second set is one space clockwise on the roulette wheel from one of the numbers in the first set of two numbers.

In various embodiments, a player may bet on a major geometrical pattern of numbers. The major geometrical pattern may be augmented with minor patterns. For example, the major pattern may consist of three numbers constituting a first set of numbers that divide the roulette wheel into arcs of three approximately equal lengths. The minor patterns may be offshoots of the three numbers constituting the first set of numbers, with each minor pattern consisting of one of the three numbers of the first set of numbers together with a number two clockwise spaces away, and another number two counter clockwise spaces away.

In various embodiments, payout ratios may be set for bets on various combinations of numbers in such a way as to mimic payout ratios if a player placed individual bets on the numbers. For example, suppose each number at a roulette wheel had a payout ratio of 35. That is, suppose a player could win 35 times his bet, and keep his initial bet, by betting on a single number and winning. If the player bet $1 on two separate numbers and won on one of them, the player would make a profit of $34. Having bet two dollars, the payout ratio would be 17. Thus, in various embodiments, a bet on a single geometric combination of two numbers may have a payout ratio of 17. In various embodiments, a payout ratio for a combination of numbers may be different from the payout ratio that would be had by betting on the numbers separately. For example, the payout ratio may be lower (e.g., to make the player pay for the convenience of making one bet rather than two) or higher (e.g., to encourage the player to try new types of bets).

In various embodiments, a player may customize the roulette wheel. In various embodiments, a player may choose the location of one or more numbers. For example, the player may choose to have the number 5 next to the number 0 on the roulette wheel. Accordingly, the number that used to be by the number 0 may be swapped for the number 5. In various embodiments, the customization of the roulette wheel may or may not actually occur physically. If the customization occurs physically then, for example, a laser projector may project images of new numbers onto the roulette wheel based on the player's desired customizations. For example, a laser projector may project the number 5 next to the number 0 at the roulette wheel. In various embodiments, a physical customization may not occur. In various embodiments, a player may define a mapping function that maps a desired or customized layout to the actual layout of the roulette wheel. The mapping function may also be defined by the casino. The player may indicate bets using his customized roulette layout. The number the player bet on may be mapped to an (e.g., different) number on the roulette wheel according to the mapping function. If the different number to which the player's chosen number has mapped actually occurs on the physical roulette wheel, then the player may win his bet. In various embodiments, a player may customize the roulette wheel such that his favored numbers (e.g., three of his lucky numbers) are adjacent on the roulette wheel, or such that his favored numbers lie at his favored locations.

In some embodiments, by defining a customization, a player may automatically place a bet. For example, if a player wishes for three particular numbers to lie adjacent on the roulette wheel, then the player may automatically define a bet on those three numbers.

In some embodiments, a player may bet on a number that lies a defined distance from the ball. For example, a player may place a bet on a number that is two spaces clockwise from the number where the ball actually lands. Thus, if the ball lands two spaces counter-clockwise from the player's number, the player may win.

In various embodiments, there could be random translations of actual wheel numbers to other wheel numbers.

In various embodiments, a player could pay for the option to jiggle the wheel one to the left or one to the right. Thus, for example, a player who had bet on a number one space clockwise or counter-clockwise from where the ball actually landed might win. In some embodiments, the direction of jiggling of the wheel e.g., left or right, might be chosen at random. The direction might also be picked by the casino.

The following are embodiments, not claims:

A. An apparatus comprising:
- a wheel with a plurality of slots, in which the wheel is free to spin about an axis;
- a smooth track surrounding the wheel for rolling a ball;
- a handle for spinning the wheel; and
- a laser disposed above the wheel along the axis of the wheel. The laser may be mobile, or at least a mirror or reflector within the laser may allow the beam to move. In various embodiments, through rapid movement of the beam, the laser may trace out letters, numbers, or other patterns.

B. The apparatus of embodiment A in which the laser is operable to trace a pattern on the wheel. In various embodiments, the laser may move the pattern in conjunction with the motion of the wheel. Thus, the laser may project a pattern which appears to remain in the same place on the wheel, even though the wheel may be spinning.

C. The apparatus of embodiment A in which the laser is operable to trace a different number adjacent to each of the plurality of slots. For example, the laser may trace or project the numbers 0 through 37 next to different slots on the wheel. In various embodiments, the laser may project the number 00 next to a slot on the wheel.

D. The apparatus of embodiment A further comprising an input device. The input device may include a keypad, touch screen, mouse, or other input device. The input device may allow a player to input an ordering of numbers to be displayed or projected upon a roulette wheel. In this way, for example, a player may set up a customized roulette wheel.

E. The apparatus of embodiment D further comprising a computing device, in which the computing device is operable to:
- receive an indication of one of the plurality of slots;
- receive an indication of a number; and
- direct the laser to trace the number adjacent to the indicated slot.

F. An apparatus comprising a computing device operable to:
- receive an indication of a bet;
- receive an indication of an amount of the bet;
- receive an indication of a first number on which the bet has been placed;
- receive an indication of a second number that has occurred in a game;
- determine a difference based on the first number and the second number; and
- determine a payout based on the amount of the bet and based on the difference.

G. The apparatus of embodiment F in which to determine a payout includes to:
- determine a payout which is equal to the product of a predetermined constant, the bet amount, and the difference.

H. The apparatus of embodiment F in which to determine a payout includes to:
- determine a payout which is equal to the sum of a first predetermined constant and the product of a second predetermined constant, the bet amount, and the difference.

I. The apparatus of embodiment F in which the game is a game of roulette.

J. The apparatus of embodiment F in which the difference is a numerical difference between the first number and the second number.

K. The apparatus of embodiment F in which the difference is a difference in position between a first slot on a roulette wheel associated with the first number, and a second slot on the roulette wheel associated with the second number. The difference in position may represent a number of slots difference (e.g., there is a three slot difference), a number of degrees of difference, a number of radians difference, or any other measure of a difference in position.

L. The apparatus of embodiment F in which to determine a payout includes to determine a negative payout based on the amount of the bet and based on the difference.

M. The apparatus of embodiment L in which the computing device is further operable to deduct value from a player account based on the negative payout. In the event of a negative payout, for example, a player may owe money to the casino.

N. The apparatus of embodiment L in which the computing device is further operable to prompt a croupier to collect money from a player based on the negative payout.

O. An apparatus comprising a computing device operable to:
- receive an indication of a geometrical pattern;
- determine a set of numbers on a roulette wheel which define vertices of the geometrical pattern;
- receive an indication of a first bet that has been made on the geometrical pattern;
- receive an indication of an amount of the first bet;
- determine a first number that occurs as the outcome of a roulette game;
- determine if the first number is one of the set of numbers; and
- determine a first payout based on the amount of the first bet and based on whether the first number is one of the set of numbers.

P. The apparatus of embodiment O in which the geometrical pattern is one of:
  (a) a square;
  (b) an equilateral triangle; and
  (c) a star.

Q. The apparatus of embodiment O in which to determine a first payout includes to determine a first payout based on the amount of the first bet, based on whether the first number is one of the set of numbers, and based on how many numbers there are in the set of numbers. For example, the more numbers in the set of numbers, the lower the payout.

R. The apparatus of embodiment O in which the computing device is further operable to receive an indication of a second number, in which to determine a set of numbers includes to determine a set of numbers on a roulette wheel which includes the second number and which define vertices of the geometrical pattern. Thus, the second number may serve as an anchor point. The other numbers in the set of numbers may then be determined by anchoring the geometrical pattern to the second number on the roulette wheel and then seeing or determining where other vertices on the pattern fall.

S. The apparatus of embodiment O in which the computing device is further operable to:
- receive an indication of a second payment;

determine a second number which is a predetermined number of slots away from the first number on the roulette wheel;
determine if the second number is one of the set of numbers; and
determine a second payout based on whether the second number is one of the set of numbers.

For example, a player may pay to spin or jiggle a roulette wheel a little bit after an outcome has been determined. The player may thus have a chance to win if the number he has bet on (or one of the numbers he has bet on) is near to the number that has actually occurred.

T. The apparatus of embodiment S in which the predetermined number of slots is one slot.

What is claimed is:

1. An apparatus comprising:
a roulette wheel with a plurality of slots, in which each slot is configured for display of a customized number;
an input device configured to receive an ordering of numbers to be displayed on the roulette wheel; and
a computing device comprising a non-transitory memory having stored thereon instructions that, when executed by the computing device, cause the apparatus to:
in response to receiving the ordering of numbers from the input device, cause each slot of the plurality of slots on the roulette wheel to display a number in accordance with the ordering.

2. The apparatus of claim 1, in which to receive the ordering, the input device is configured to receive an indication of one of the plurality of slots and receive an indication of a number; and in which execution of the instructions causes the n number to be displayed adjacent to the slot.

3. The apparatus of claim 1, in which to receive the ordering, the input device is configured to receive a first number associated with a first slot of the roulette wheel and receive a second number associated with a second slot of the roulette wheel; and in which execution of the instructions causes the first number to be displayed adjacent to the first slot and the second number to be displayed adjacent to the second slot.

4. The apparatus of claim 1, in which the apparatus further comprises one or more lasers and in which causing the numbers to be displayed includes causing the one or more lasers to project the numbers.

5. The apparatus of claim 1, in which execution of the instructions causes the computing device to:
receive a bet on a number of the numbers;
determine an outcome of a spin of the roulette wheel; and
determine a number of slots way from the outcome that the number is caused to be displayed on the roulette wheel.

6. The apparatus of claim 5, in which execution of the instructions causes the computing device to: determine a balance adjustment based on the number of slots away being less than some amount but greater than zero.

7. The apparatus of claim 6, in which determining the balance adjustment includes
determining the balance adjustment which is equal to the product of a predetermined constant, a bet amount, and the number of slots.

8. The apparatus of claim 6, in which to determining the balance adjustment includes determining a negative balance adjustment based on the amount of the bet and based on the number of slots.

9. An apparatus comprising:
a roulette wheel with a plurality of slots, in which each slot is configured for display of a customized number;
an input device configured to receive an ordering of numbers to be displayed on the roulette wheel; and
a computing device comprising a non-transitory memory having stored thereon instructions that, when executed by the computing device, cause the apparatus to:
in response to receiving the ordering of numbers from the input device, cause the numbers to be displayed on the roulette wheel in accordance with the ordering;
receive an indication of a geometrical pattern;
determine a set of the numbers which define points of the geometrical pattern in accordance with the ordering;
receive an indication of a first bet that has been made on the geometrical pattern;
receive an indication of an amount of the first bet;
determine a first number that occurs as an outcome of a roulette game;
determine if the first number is one of the set of the numbers; and
determine a balance adjustment based on the amount of the first bet and based on whether the first number is one of the set of the numbers.

10. The apparatus of claim 9, in which execution of the instructions cause the computing device to:
display an indication of the set of the numbers.

11. The apparatus of claim 9, in which determining the balance adjustment payout includes determining a first payout based on an amount of numbers that are in the set of the numbers over a set of outcomes of the roulette wheel, in which the set of outcomes includes the outcome.

12. The apparatus of claim 9, in which the points include vertices of the geometrical pattern.

13. The apparatus of claim 9, in which the pattern includes an arc and the points include points along the arc.

14. The apparatus of claim 9, in which the indication of the geometrical pattern includes a choice by a player of the geometrical pattern from a plurality of available geometrical patterns.

15. An apparatus comprising:
a roulette wheel with a plurality of slots, in which each slot is configured for display of a customized number;
an input device configured to receive an ordering of numbers to be displayed on the roulette wheel; and
a computing device comprising a non-transitory memory having stored thereon instructions that, when executed by the computing device, cause the apparatus to:
in response to receiving the ordering of numbers from the input device, cause the numbers to be displayed on the roulette wheel in accordance with the ordering;
receive a bet on a number of the numbers;
determine an outcome of a spin of the roulette wheel;
determine a number of slots way from the outcome that the number is caused to be displayed on the roulette wheel;
determine a balance adjustment based on the number of slots away being less than some amount but greater than zero, in which to determining the balance adjustment includes determining a negative balance adjustment based on the amount of the bet and based on the number of slots; and
prompt a croupier to collect money from a player based on the negative balance adjustment.

* * * * *